(12) United States Patent
Chandra et al.

(10) Patent No.: US 6,789,127 B1
(45) Date of Patent: Sep. 7, 2004

(54) PREPARATION FOR NETWORK INTERFACE RECOGNITION OF NETWORK PACKET PORTION WITH DECLARATIVE NOTATION FOR FIELD THEREOF AND CONSTRAINT THEREFOR

(75) Inventors: Satish Chandra, Naperville, IL (US); Peter James McCann, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/504,627

(22) Filed: Feb. 15, 2000

(51) Int. Cl.$^7$ ............................................. G06F 15/16
(52) U.S. Cl. ........................................ 709/246; 717/8
(58) Field of Search ................................ 709/224, 230, 709/236, 250, 246; 717/4, 5, 8, 9, 143, 114, 146; 706/47, 14

(56) References Cited

U.S. PATENT DOCUMENTS

| | | | | |
|---|---|---|---|---|
| 5,758,070 A | * | 5/1998 | Lawrence | 395/200.5 |
| 5,790,799 A | * | 8/1998 | Mogul | 395/200.54 |
| 5,826,032 A | * | 10/1998 | Finn et al. | 395/200.66 |
| 5,937,169 A | * | 8/1999 | Connery et al. | 395/200.8 |
| 6,047,311 A | * | 4/2000 | Ueno et al. | 709/202 |
| 6,192,409 B1 | * | 2/2001 | Kim | 709/230 |
| 6,243,360 B1 | * | 6/2001 | Basilico | 370/231 |
| 6,292,838 B1 | * | 9/2001 | Nelson | 709/236 |
| 6,321,338 B1 | * | 11/2001 | Porras et al. | 713/201 |
| 6,330,616 B1 | * | 12/2001 | Gioquindo et al. | 709/236 |
| 6,336,214 B1 | * | 1/2002 | Sundaresan | 717/143 |
| 6,356,951 B1 | * | 3/2002 | Gentry, Jr. | 709/250 |
| 6,466,894 B2 | * | 10/2002 | Takeuchi et al. | 702/181 |
| 6,484,170 B2 | * | 11/2002 | Abdat | 707/6 |
| 6,606,710 B2 | * | 8/2003 | Krishnan et al. | 713/201 |
| 2003/0005181 A1 | * | 1/2003 | Bau et al. | 709/330 |

OTHER PUBLICATIONS

Stevens; TCP/IP Illustrated; 1994; Addison–Wesley; vol. 1; Ch 3, pp. 33–51.*
Stevens et al.; TCP/IP Illustrated; 1995; Addison–Wesley; vol. 2; Ch 8, pp. 205–212.*
Chandra et al.; Packet Classification using Abstract Types; 1999; Bell Labs Technical Report.*
Chandra et al.; Packet Types: Abstract Specification of Network Protocol Messages; 2000; Proceedings of ACM SIGCOMM.*
Chandra, Satish and McCann, Peter J.; "Packet Types"; WCSSS'99, ACM SIGPLAN Workshop on Compiler Support for System Software, Atlanta, GA, USA May 1st, 1999; Mar. 1, 1999; pp. 82–93; No. 0228; Institut National De Recherche en Informatique Et En Automatique ("INRA"); France.

* cited by examiner

Primary Examiner—Glenton B. Burgess
Assistant Examiner—Kimberly Flynn (57) ABSTRACT

A system includes a compiler component that employs a declarative notation, for a description, that describes one or more fields of a network packet. The compiler component employs a declarative notation, for the description, that describes one or more constraints for at least one field of the one or more fields. The description is of a portion of the network packet. A representation based on the description is employable for recognition of the portion of the network packet at a network interface.

59 Claims, 6 Drawing Sheets

PREPARATION FOR NETWORK INTERFACE RECOGNITION OF NETWORK PACKET PORTION WITH DECLARATIVE NOTATION FOR FIELD THEREOF AND CONSTRAINT THEREFOR

TECHNICAL FIELD

This invention relates generally to networking and more particularly to recognition of portion of a network packet at a network interface.

BACKGROUND OF THE INVENTION

Networking software is difficult to construct. One reason for this difficulty is that the physical on-the-wire representation of a network packet is not the same as the logical structure of the protocol data carried by the packet. So, a programmer must write interface code, usually as low level C, that understands the grammar of a packet and also performs necessary byte-order and alignment adjustments. Also, domain-specific information about the packet structure must often be coded at multiple locations in the system. The implementation of interface code, therefore, becomes a cumbersome and error-prone process.

Networking code in a system must interface with bare hardware in a network device, and at the same time implement complicated real-time algorithms. Generally, low-level data manipulation requirements and an emphasis on high performance have limited the choice of an implementation language to C. As a result, the development, testing, and deployment of new protocols is typically a slow and expensive process.

Motivated by this problem, significant research and effort have been directed to the development of systematic software architectures and languages for constructing networking software, usually by addressing a specific aspect of the complexity of networking code. One approach tries to better express the modular structure and composition of protocol layers. Another approach tries to better express the reactive control within each layer. A further approach emphasizes the verification aspect.

An additional aspect of the complexity of networking code comprises the low-level processing that takes place at the interfaces between the wire representation of a network packet and the protocol code in a host machine. This low-level processing typically involves data marshaling and unmarshaling, and packet classification (i.e., filtering) based on values extracted from the wire representation. The commonality in these tasks is that their implementation must take into account the physical on-the-wire layout of the logical protocol data. To allow interoperability, the physical formats usually are independent of any given machine's architecture. The physical formats typically pack data together as tightly as possible, to minimize the overhead per unit of actual content, for the header.

One can, for illustrative purposes, consider the interface tasks in a firewall implementation such as Linux (v2.0.32). The following Example 1 shows an abstracted form of code in Linux networking module (net/ipv4).

```
ip_fw_chk(struct iphdr *ip) {
    struct tcphdr *tcp =
        (struct tcphdr *)((_32 *)ip + ip->ihl);
    int offset =
        ntohs(ip->frag_off) & IP_OFFSET;
    ...
    switch (ip->protocol) {
        case IPPROTO_TCP:
            if (!offset) {
                src_port = utohs(tcp->source);
                dst-port = ntohs(tcp->dst);
                ...
```

Example 1 first computes the starting address of an IP packet's payload into the variable tcp, by adding the size of the header (field ihl) to the start of the packet. Example 1 then computes the offset of the present IP fragment into the variable offset. As will be understood by those skilled in the art, a long payload may be transmitted by IP as a series of IP fragments, each of which contains a segment of the original payload, and an indication of those offset of the segment in the original payload.

In Example 1, the macro ntohs converts a network byte order representation to the host byte order representation for a 16-bit quantity. If the protocol in the payload is TCP and the offset is zero (first fragment), Example 1 extracts the source and destination port numbers from the TCP header. Subsequent code (not shown) implements specific firewall policies based on this extracted and other information, as will be understood by those skilled in the art.

The style of programming interface tasks of Example 1 has several drawbacks. For instance, a programmer must explicitly encode the layout of an IP packet using pointer arithmetic and bit operations. Further, the programmer must explicitly encode, using conditionals, the correlation between the protocol field's value of IPPROTO_TCP and the payload being a TCP packet. Also, the programmer must remember to convert, at all appropriate places, multi-byte numeric quantities between the network byte order and the host byte order. To put this burden in perspective, endianness related macros hton* and ntoh* appear together about 300 times in the net/ipv4 of the Linux implementation (v2.0.32). Each occurrence of such cumbersome programming, increases the possibility of coding error in offsets, sizes, correlations, or endianness.

As will be understood by those skilled in the art, interface tasks are pervasive in networking code. In the core protocol implementation, interface tasks occur in each layer of a protocol stack at input functions (such as ip_receive and tcp_receive for IP and TCP) and output functions (such as the corresponding ip_send and tcp_send). Interface tasks also occur in the implementation of increasingly important system services such as network monitoring, accounting, and security.

One example of such an implementation comprises a packet filter. A packet filter demultiplexes the incoming packet to a user-level process, depending on the filter specified by the process. Essentially, filter specifications parse the packet in the general style of Example 1. One notable difference from Example 1, is that filter specifications normally are byte-codes for the packet filter's virtual machine. Furthermore, hierarchical packet formats exist in contexts other than Internet protocols, giving rise to similar interface programming problems.

The programming style of Example 1 also raises concerns with respect to software engineering. For example, the same information of how to parse a packet, is encoded at multiple sites in a system, when that information should ideally be factored out (the "write once" principle). Moreover, there is no system-wide, formal description of the packet format. Instead, the packet format is hard coded at each instance of interface code. This disadvantageously precludes use of automated techniques (such as model-checking) for verifying an implementation of a protocol or service against a specification.

It would be desirable were "types" in a programming language employed to encode the description of a packet. For example, in the Standard ML programming language, one might tentatively express the logic of Example 1 using the code fragment of the following Example 2.

```
case (#payload ip) of
    TCP {source, dst, . . . } =>
        if ((#offset ip) = 0) then
        . . .
```

The syntax #field var in Example 2 comprises field selection from a record. The term on the left of→ comprises a pattern, here matching the datatype TCP. In contrast to Example 1, the programmer in Example 2 need not explicitly interpret the wire format.

Although Example 2 simplifies one aspect programming, there are compelling reasons why protocol code is not written this way. First, marshaling and unmarshaling between the high-level data type and the wire format would be prohibitively expensive. Second, if a protocol layer needs to export a uniform, composable interface, one cannot assign a type to the payload because the set of possible data types that the interface must match, is unknown.

Turning to C code, C aggregate types (structs and unions) do not incur as high an overhead cost as Example 2 in terms of marshaling and unmarshaling between the high-level data type and the wire format. This is because in C, one can cast a void* buffer to any other pointer type, and vice versa. Nevertheless, software applications typically need to perform some adjustments before using a value as a primitive type, because of possible mismatches of alignment and byte order between a host machine's format and the network format.

Unfortunately, the C-type system is inadequate for describing packet formats. For instance, protocol headers can contain fields whose size depends on the value of a previous field in the header. For example, the options field in an IP header can occupy between 0 to 40 bytes depending of the value of a previous field ih1 (header length). In addition, variable-size fields cannot be represented as static types (data structures whose memory can be allocated at compile time). Moreover, pointer-based data structures (such as linked lists) involve dynamic memory allocation, which would be too expensive to use in this context. Furthermore, the C-type system does not guarantee that the interpretation of a union will be chosen in accordance with the value of a discriminating field. For example, suppose one wishes to represent an IP payload as a union of TCP and UDP types (discounting modularity issues). If the protocol field in an IP header is set to the value 17, the C-type system cannot constrain the interpretation of the payload to UDP, as will be appreciated by those skilled in the art.

Thus, a need exists for an enhanced approach for preparation of a description of a network packet. Another need exists for enhanced preparation for recognition of a network packet at a network interface. A further need exists for enhanced employment of a description of a network packet. A need also exist for enhanced recognition of a network packet at a network interface. Yet another need exists for enhanced preparation of a representation employable for recognition of a network packet at a network interface. A still further need exists for enhanced allowance for determination of a type for a network packet at a network interface.

SUMMARY OF THE INVENTION

Pursuant to the present invention, shortcomings of the existing art are overcome and additional advantages are provided through the provision of preparation for network interface recognition of network packet portion with declarative notation for field thereof and constraint therefor.

The invention in one embodiment encompasses a method for preparing a description of a portion of a network packet. A representation based on the description is employable for recognition of the portion of the network packet at a network interface. There is employed, in the description, a declarative notation that describes one or more fields of the network packet. There is employed, in the description, a declarative notation that describes one or more constraints for at least one field of the one or more fields.

Another embodiment of the invention encompasses a system for employing a description of a portion of a network packet. A representation based on the description is employable for recognition of the portion of the network packet at a network interface. The system includes a compiler component that employs a declarative notation, for the description, that describes one or more fields of the network packet. The compiler component employs a declarative notation, for the description, that describes one or more constraints for at least one field of the one or more fields.

A further embodiment of the invention encompasses an article of manufacture. At least one computer usable medium has computer readable program code means embodied therein for causing employment of a description of a portion of a network packet. A representation based on the description is employable for recognition of the portion of the network packet at a network interface. There is also provided computer readable program code means for causing a computer to employ a declarative notation, for the description, that describes one or more fields of the network packet. There is also provided computer readable program code means for causing a computer to employ a declarative notation, for the description, that describes one or more constraints for at least one field of the one or more fields.

DETAILED DESCRIPTION

In accordance with the principles of the present invention, a declarative notation is employed in a description of one or more fields of a network packet, and a declarative notation is employed in a description of one or more constraints for at least one field of the one or more fields of the network packet, with a representation based on the description employable for recognition of the portion of the network packet at a network interface.

In one embodiment, a packet specification language serves to describe packet formats. The packet specification language can supply an external type system for a packet format. In one example, the specification language is declarative, in contrast to previous approaches that employed operational languages. A compiler for the language can generate code that has enhanced efficiency, for type-checking a packet (e.g., matching a packet against a type). Layering of protocols can be expressed naturally, for instance, as a refinement on types. Packet classification (e.g., filtering) can be expressed as type-based dispatch. Clean and efficient interface code can be obtained, sparing low-level programming tasks. The packet grammar can be abstracted away into a separate specification language. Recognizers for packets can be created automatically.

For instance, a packet description compiler can automatically generate interface code between the wire representation and a host language's representation of a packet, desirably eliminating the previous need for cumbersome low-level code. In another example, one can automatically derive a packet filter specification by defining a suitable type, advantageously avoiding the previous need to write a separate filtration program therefor.

For illustrative purposes, now are listed a number of exemplary features for a language. Packet specifications comprise types. A fundamental operation on packets comprises checking the membership of packets in a type. Layering of protocols is expressed as successive specialization on types. A filter for a packet comprises a constrained type.

Figure 1:
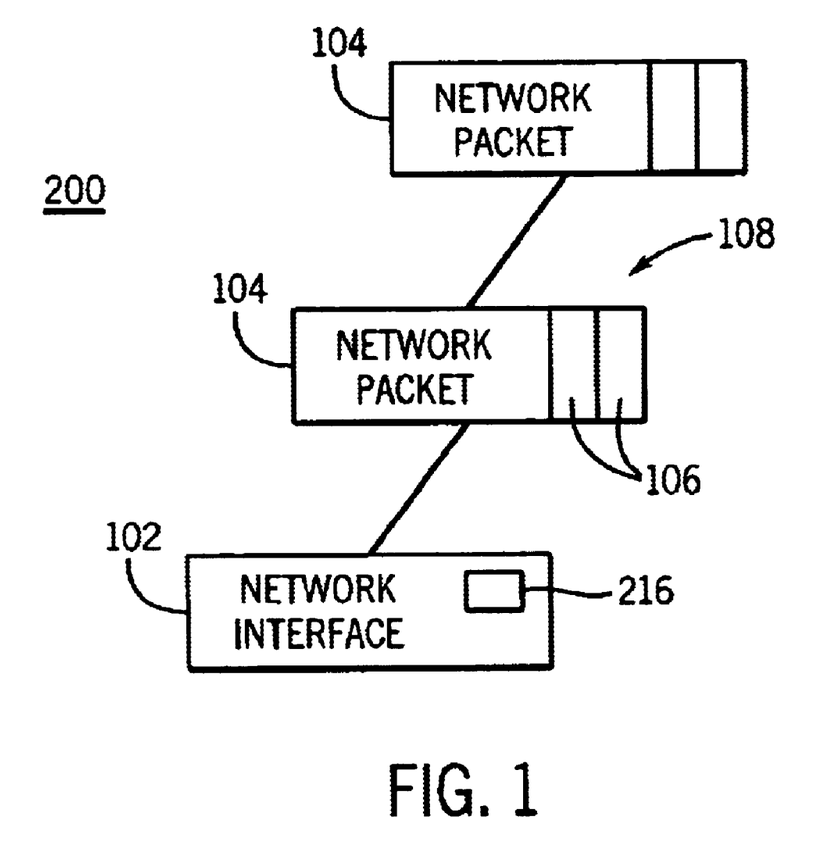
FIG. 1 represents a part of one example of a system that includes a network interface that receives a plurality of exemplary network packets having fields and comprising types.

Turning to FIG. 1, system 200 includes a plurality of components such as computer software and/or hardware components. A number of such components, in one example of system 200, can be combined or divided, as will be appreciated by those skilled in the art.

Referring further to FIG. 1, system 200 includes network interface 102. Network interface 102 receives a plurality of instances of network packet 104. Network packet 104 comprises one or more instances of field 106. As described herein, the layout of fields 106 within a network packet 104 comprises a type 108. In one example, the semantics of a type 108 comprise a subset of all binary strings, as will be appreciated by those skilled in the art.

Figure 2:
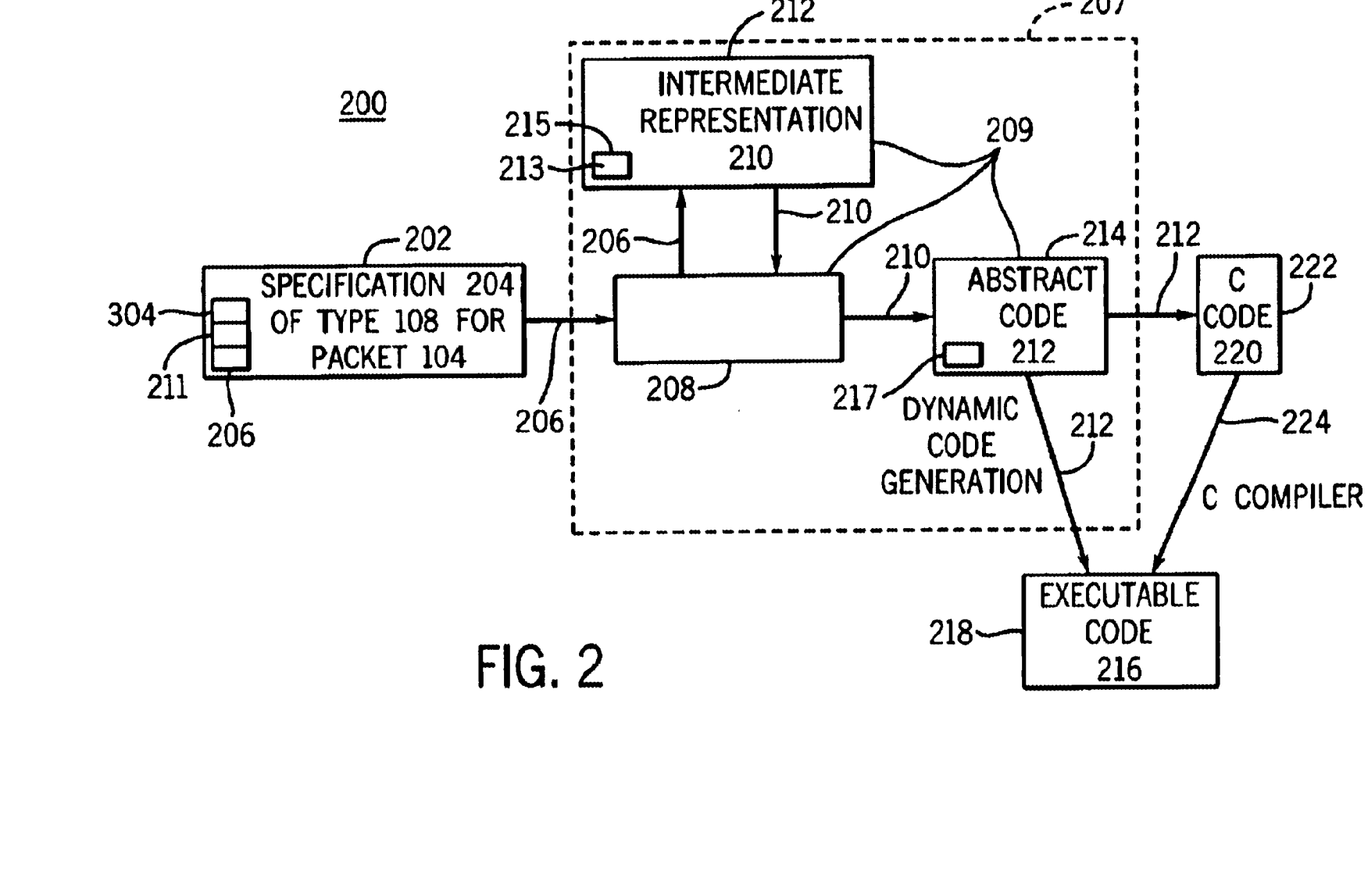
FIG. 2 is a functional block diagram of another part of the system of FIG. 1 for preparing and employing a description of a portion of network packet, and preparing and employing a representation based on the description, for recognition of the portion of the network packet at the network interface of FIG. 1.

Turning to FIG. 2, a number of components of system 200 comprise, for instance, software components. For example, in component 202 a programmer or engineer (not shown) prepares specification 204 of type 108 for network packet 104, as described herein. For instance, specification 204 comprises description 206. Description 206, in one example, serves to describe a number of formats 211 and/or constraints 304 for fields 106 (FIG. 1). In a further example, description 206 employs a high-level notation. Exemplary high-level notation is presented herein, for explanatory purposes. Component 202 is coupled with component 208.

Referring still to FIG. 2, component 208 receives description 206 from component 202. In one example, compiler 209 comprises some or all of components 208, 212, and 214, as described herein. For instance, some or all of components 208, 212, and 214 comprise same component 207. Compiler 209 comprises, for example, a types compiler. Compiler 209 understands the syntax of description 206. Compiler 209 employs description 206 to construct intermediate representation 210 of component 212.

Again referring to FIG. 2, intermediate representation 210 comprises, for example, a collection of data structures 215 that hold syntactic and/or semantic information 213. In one example, syntactic and semantic information 213 comprises the names and offsets (e.g., field offsets 306, FIG. 3) of fields 106 of network packet 104. Compiler 209 employs intermediate representation 210 to generate abstract code 212 of component 214, Still referring to FIG. 2, abstract code 212, in one example, comprises instructions 217 that are compatible with a plurality of languages and/or (e.g., machine) architectures. For instance, abstract code 212 describes procedures for matching and/or otherwise processing network packets 104, as will be appreciated by those skilled in the art.

Referring again to FIG. 2, in one example, system 200 employs compiler 209 for employment of abstract code 212 to generate executable code 216 of component 218. In a further example, system 200 employs compiler 209 for employment of abstract code 212 to generate C code 220 of component 222. C code 220 can be employed for generation of executable code 216 of component 218. For instance, system 200 can employ C compiler 224 to generate executable code 216 from C code 220. In one example, C compiler 224 comprises a C compiler supplied with an operating system for a computer, as will be understood by those skilled in the art.

For explanatory purposes, FIGS. 3–6 and the discussion herein including Examples 3–9 and Table 1, present additional illustrative implementation details of system 200.

Figure 3:
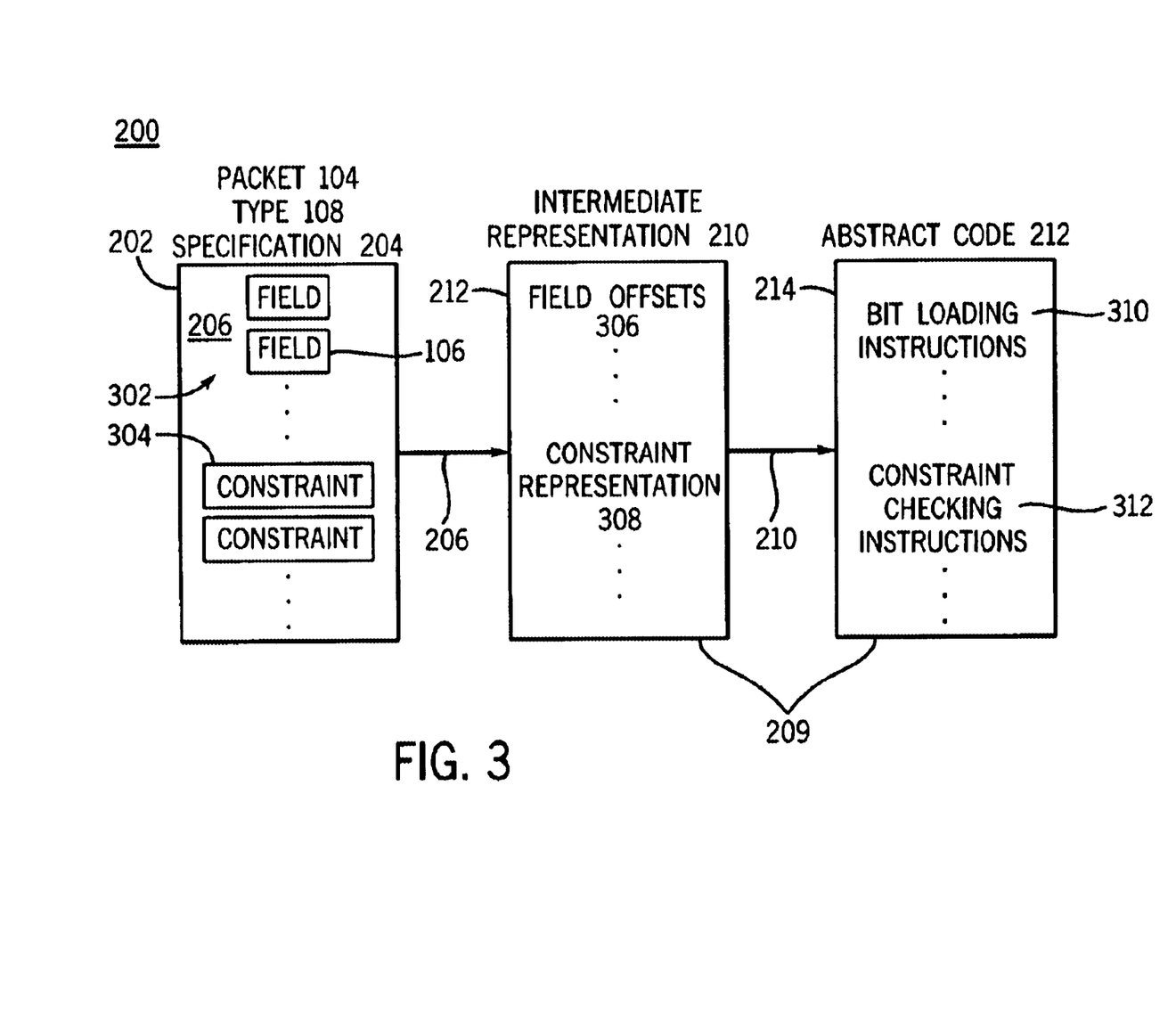
FIG. 3 is a functional block diagram of one example of additional details of a portion of the part of the system of FIG. 2, illustrating exemplary construction of one example of a type of network packet.

Turning to FIG. 3, components 202, 212, and 214 serve to construct one example of a type 108 of packet 104. In component 202, specification 204 of type 108 comprises a list 302 of fields 106 and constraints 304. Component 202 employs list 302 as part of description 206 of type 108. System 200 employs compiler 209 to translate description 206 into intermediate representation 210 of component 212. In one example, compiler 209 employs the types 108 and the constraints 304 to assign offsets 306 to the beginning of each field 106, and to assign a size to each field 106. For instance, the size of field 106 comprises a number of bits allocated for that field 106. In a further example, intermediate representation 210 comprises constraint representation 308. Constraint representation 308, for instance, stores a representation of constraints 304 as a parse tree of an underlying Boolean expression, as will be appreciated by those skilled in the art. Compiler 209 translates intermediate representation 210 into abstract code 212 of component 214. For instance, abstract code 212 comprises a number of bit-loading instructions 310 and constraint-checking instructions 312. In one example, constraint-checking instructions 312 comprise instructions to check constraints 304 specified in description 206, against bits present in a buffer at network interface 102 (FIG. 1), as will be appreciated by those skilled in the art.

The following Example 3 begins with one permanent type, "bit," and adds the ability to define new types using advantageously few operators.

byte:=bit[8];

bytestring:=byte[ ];

In one example, definitions have the form "name:=type." Example 3 defines the term "byte" to comprise a sequence of exactly eight bits. The square bracket operator "[ ]" in conjunction with a constant argument, serves to constrain the repetition to have exactly the number of occurrences given by the constant argument. Also, Example 3 defines "bytestring" to comprise an arbitrarily long sequence of bytes.

In addition, the following Example 4 advantageously allows grouping and sequencing of terms to form structures. For explanatory purposes, Example 4 illustrates the specification of an Internet Protocol ("IP") packet.

```
nybble := bit[4];
short := bit[16];
long :=bit[32];
IP_PDU := {
    nybble      version;
    nybble      ihl;
    byte        tos;
    short       totallength;
    short       identification;
    bit         morefrags;
    bit         dontfrag;
    bit         unused;
    bit         frag_off[13];
    byte        ttl;
    byte        protocol;
    short       cksum;
    long        src;
    long        dest;
    ip_option   options[ ];
    bytestring  payload;
} ...
```

In Example 4, IP_PDU defines the fields of an Internet Protocol version 4 header, as will be appreciated by those skilled in the art. The type "IP PDU" imposes a structure on packets. Without additional constraints, however, IP_PDU undesirably allows many sequences of bits that comprise invalid IP packets.

The following Example 5 provides the needed constraints in a "where" clause.

```
IP_PDU := {
    ...
} where {
    version#value = 0x04;
    options#numbytes = ihl#value * 4 − 20;
    payload#numbytes = totallength#value − ihl#value * 4;
}
```

Example 5, illustrates that, in one example, a set of constraints in a "where" clause may follow any newly-defined type. Example 5 employs such constraints to specify that a certain field will hold a certain constant value, and to specify the length of variable-length fields. In a further example, any kind of constraint, including, for instance, relational operators ">" and "<" and Boolean combinators may be employed, as will be appreciated by those skilled in the art.

The constraints of Example 5 specify that the version field is set to 4 (for IP version 4), and give the number of bytes occupied by the options and payload fields. Example 5 employs the syntax field#attribute to reference specific attributes of the given fields. For explanatory purposes, the following Table 1 provides a partial list of exemplary attributes and meanings.

| Attribute | Meaning |
| --- | --- |
| value | The natural number formed by concatenating all the bits of the field in network order. |
| numbits | The total number of bits occupied by the field. |
| numbytes | The total number of bytes occupied by the field. |
| numelems | The number of elements in an array-type field. |
| alt | For an "alternative type" field, a collection of Booleans indicating which alternative was chosen. |

Figure 4:
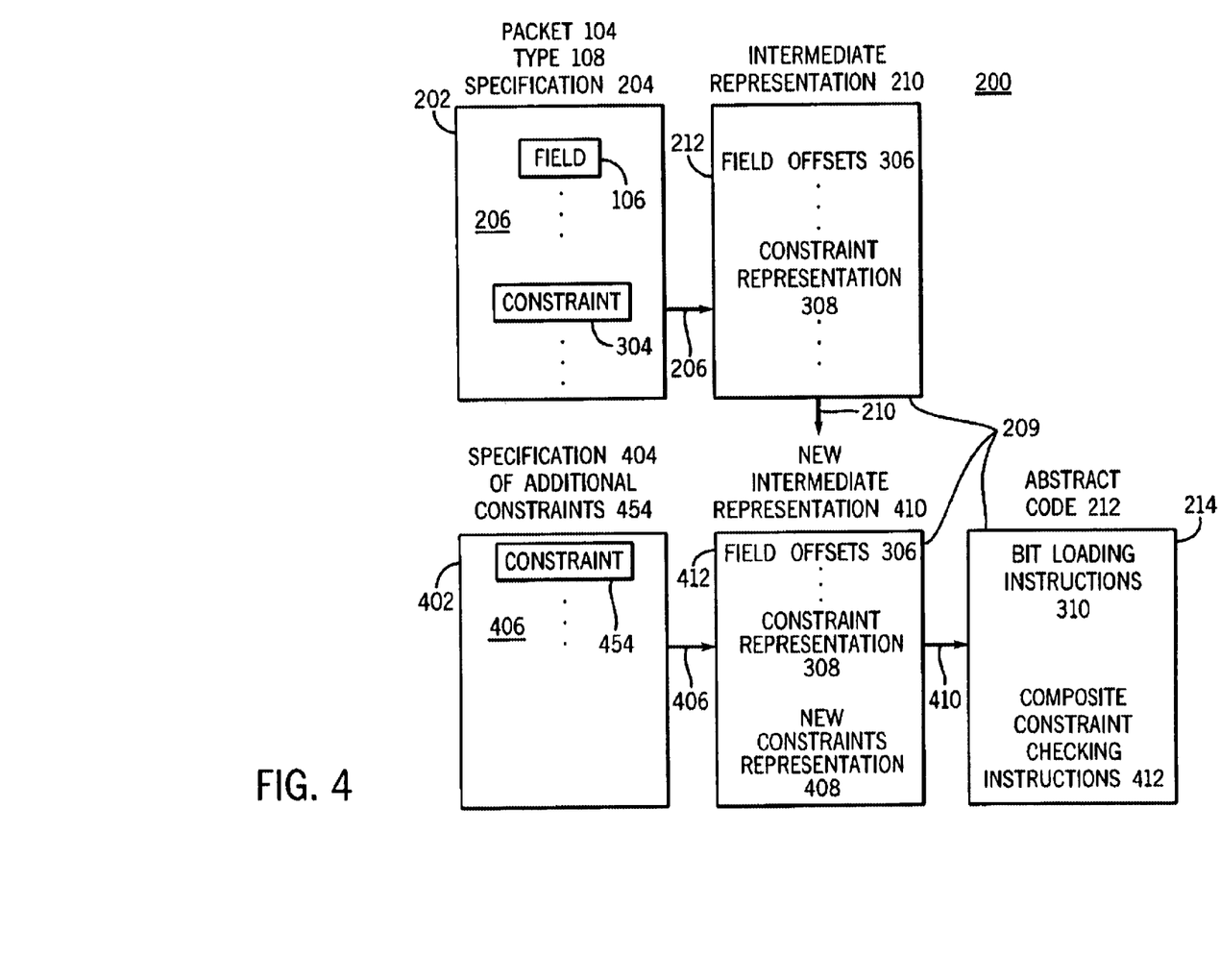
FIG. 4 is a functional block diagram of another example of additional details of a portion of the part of the system of FIG. 2, illustrating exemplary creation of a new type of network packet through addition of new constraints that refine an existing type.

Turning to FIG. 4, system 200 creates a new (e.g., a second) instance of type 108 by refining a first (e.g., an existing) instance of type 108 (specified in component 202) through additional constraints 454 (specified in component 402). System 200, in one example, includes component 202 that passes description 206 to component 212. The component 212 passes intermediate representation 210 to component 412.

Again referring to FIG. 4, component 402 comprises a specification 404 of additional constraints 454. The component 402 passes description 406 to component 412. The description 406 is based on the specification 404 of the additional constraints 454. The component 412 employs the intermediate representation 210 (from component 212) and the description 406 (from component 402) to create a new intermediate representation 410. The component 412 creates new constraint representation 408 in the new intermediate representation 410. The component 412 passes the new intermediate representation 410 to component 214.

Referring further to FIG. 4, compiler 209 employs additional constraints 454 from component 402 to extend intermediate representation 210 of first instance of type 108 (specified in component 202), for creation of new intermediate representation 410 of new instance of type 108 (specified in component 402). This advantageously enables, for example, incremental development of (e.g., complex) types 108 of packets 104.

Still referring to FIG. 4, component 412 passes new intermediate representation 410 to component 214. Abstract code 212 of component 214, in one example, comprises bit-loading instructions 310 and composite constraint-checking instructions 412.

The following Example 6 illustrates refinement of a first type 108 into a new type 108.

```
IP_mysource :> IP_PDU where {
    src#value = 192.168.0.1;
}
```

Example 6 employs the refinement operator ":>" to introduce new constraints 304 on an already-defined type 108. For illustrative purposes, Example 6 defines an IP packet from a given source address. In one example, the type IP_mysource is the same as the type IP_PDU in every respect, except that the source address is constrained to have the value 192.168.0.1.

Figure 5:
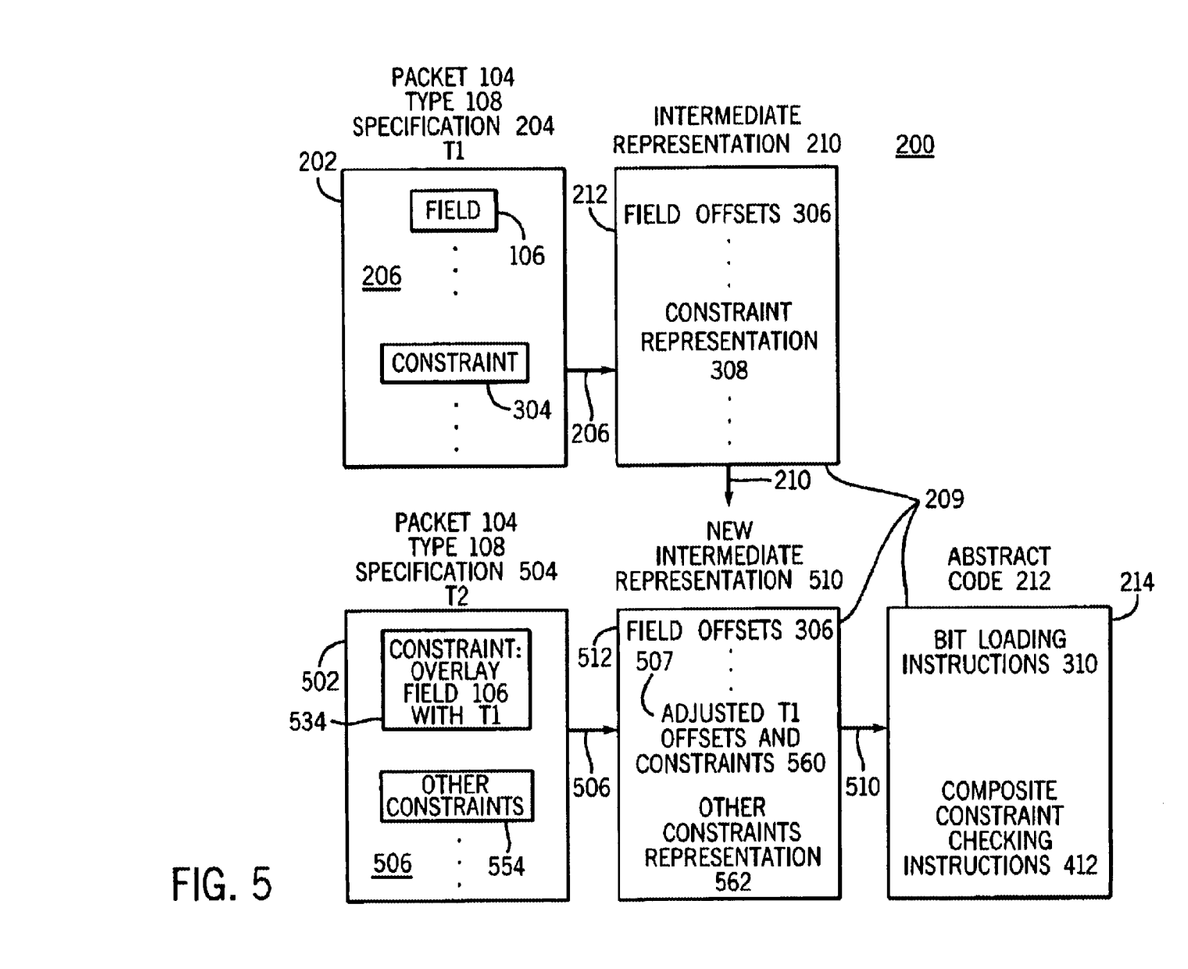
FIG. 5 is a functional block diagram of a yet another example of additional details of a portion of the part of the system of FIG. 2, illustrating an exemplary overlay constraint.

Turning to FIG. 5, system 200 employs an overlay constraint 534 of component 502, as described herein. System 200 includes type T1 as a first instance of type 108, and type T2 as a second instance of type 108. When a field 106 of type T2 is overlaid by type T1, compiler 209 incorporates description 206 of type T1 into intermediate representation 510 of type T2. In one example, compiler 209 adjusts offsets 306 for representation of fields 106 in type T1, so fields 106 of type T1 are represented at offset 507 in type T2. In a further example, system 200 performs model encapsulation of type T1 as a payload in type T2.

Again referring to FIG. 5, component 202 comprises specification 204 of instance T1 of type 108. Specification 204 comprises description 206. Component 202 passes description 206 to component 212. The component 212 passes intermediate representation 210 to component 512.

Still referring to FIG. 5, component 502 comprises specification 504 of instance T2 of type 108. Specification 504 comprises description 506. Description 506 describes a number of fields 106, overlay constraint 534, and other constraints 554. The component 502 passes description 506 to component 512. The component 512 employs intermediate representation 210 and the description 506, to incorporate description 206 of instance T1 of type 108 (specified in component 202) into intermediate representation 510 of instance T2 of type 108 (specified in component 502). The intermediate representation 510 comprises representation 560 of a portion of intermediate representation 210, as directed by overlay constraint 534. In addition, intermediate representation 510 comprises representation 562 of other constraints 554. Component 512 passes intermediate representation 510 to component 214.

The following Example 7 employs an overlay feature to merge specification 204 of instance T1 of type 108, and specification 504 of instance T2 of type 108, through exemplary embedding of one within the other.

```
UDPinIP :> IP_PDU where {
    protocol#value = 17;
    overlay payload with UDP_PDU;
}
```

For illustrative purposes, Example 7 specifies the User, Datagram Protocol (UDP) within IP, with an assumption that UDP_PDU is appropriately specified elsewhere. In one advantageous aspect, the style of Example 7 is employable for layered protocols. In Example 7, the protocol field of IP, which designates the protocol which is encapsulated, is constrained to have the value 17. For instance, another "where" clause (not shown) may follow the overlay constraint, specifying extra constraints on the fields of the UDP_PDU, as will be appreciated by those skilled in the art.

Figure 6:
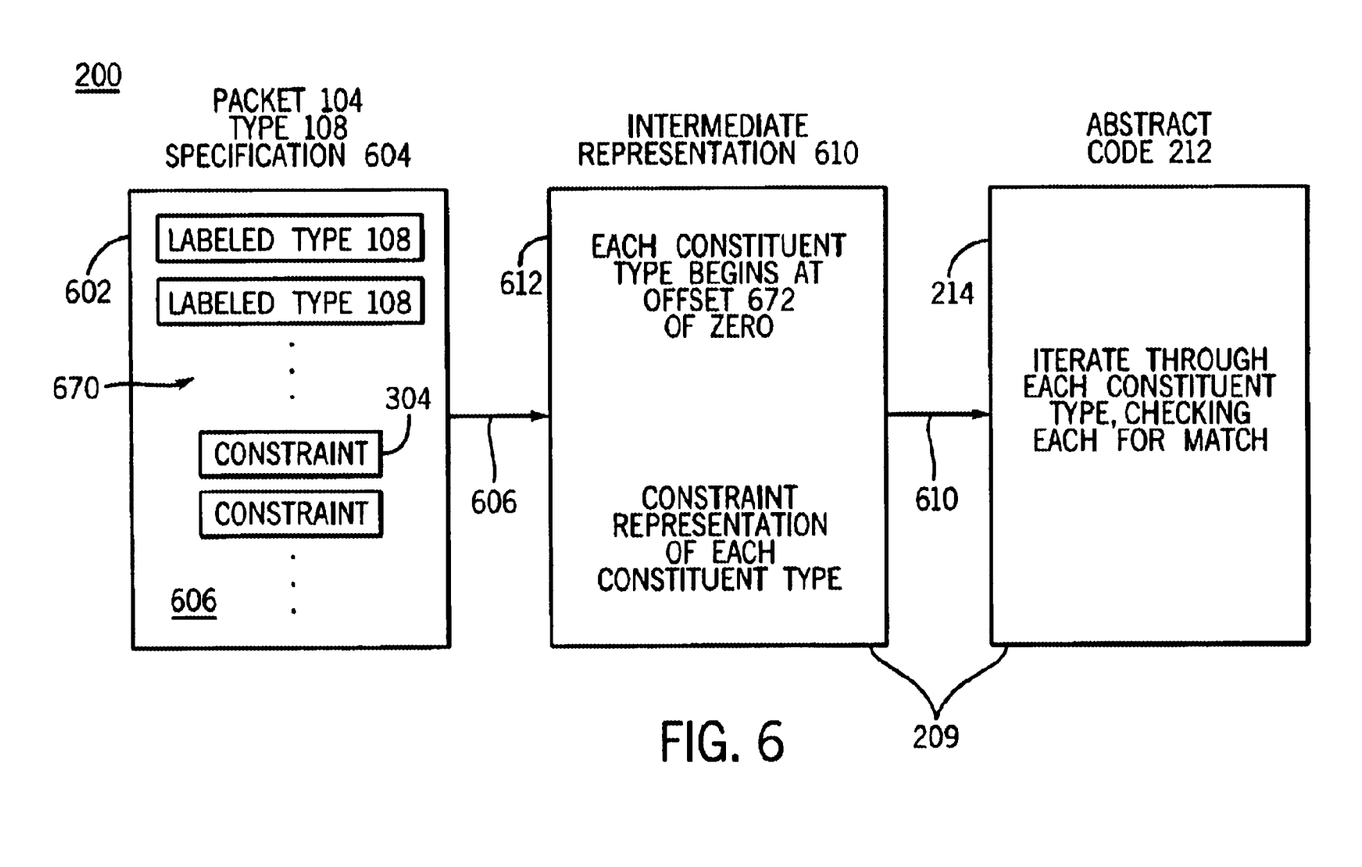
FIG. 6 is a functional block diagram of a further example of additional details of a portion of the part of the system of FIG. 2, illustrating exemplary creation of types of network packets that take on one of a plurality of possible descriptions.

Turning to FIG. 6, system 200 creates types 108 that take on one of a number of possible descriptions. In component 602, specification 604 of type 108, comprises a list 670 of the possible descriptions. Component 602 employs list 670 as part of description 606 of type 108. The component 602 passes description 606 to component 612. System 200 employs compiler 209 to create intermediate representation 610 of the component 612. In intermediate representation 610, a representation of each type 108 of the possible types 108 from list 670, begins at offset 672 of value zero (e.g., representative of the beginning of packet 104). Component 612 passes intermediate representation 610 to component 214.

Referring further to FIG. 6, abstract code 212 of component 214, in one example, employs intermediate representation 610 to iterate through a representation of list 670. The abstract code 212 employs intermediate representation 610, for instance, to check constraints 304 of each possible type 108 until locating a match.

The following Example 8 illustrates a list of alternatives.

```
infoelem |= {
    Type1SingleOctetInfoelem t1;
    type2SingleOctetInfoelem t2;
    MultiOctetInfoelem multi;
}
```

In Example 8, a packet of type "infoelem" can take on any of the types Type1SingleOctetInfoelem, Type2SingleOctetInfoelem, or MultiOctetInfoelem. The following Example 9 illustrates how to make use of the "alternative attribute."

```
BC_group5case2 := {
    infoelem linfo;
} where {
    linfo#alt@multi;
}
```

In Example 9, a BC_group5case2 packet has a single field of type "infoelem". The constraint requires that the particular alternative must be "multi." So, in Example 9, the chosen alternative must be of type "MultiOctetInfoelem."

The flow diagrams depicted herein are just exemplary. There may be many variations to these diagrams or the steps (or operations) described therein without departing from the spirit of the invention. For instance, the steps may be performed in a differing order, or steps may be added, deleted or modified. All these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method in a computer for preparing a description of a portion of a network packet, a representation based on the description employable for recognition of the portion of the network packet at a network interface, the method comprising the steps of:

employing, in the description, a computer-readable declarative notation that describes one or more fields of the network packet;

employing, in the description, a computer-readable declarative notation that describes one or more constraints for at least one field of the one or more fields;

automatically converting the description of the portion of the network packet from the computer-readable declarative notation that describes the one or more fields of the network packet into computer-executable code.

2. The method of claim 1 wherein the step of employing, in the description, the computer-readable declarative notation that describes the one or more fields of the network packet comprises the step of employing, in the description, a computer-readable declarative notation that describes a field of the network packet, and wherein the step of employing, in the description, the computer-readable declarative notation that describes the one or more constraints for the at least one field of the one or more fields comprises the step of employing, in the description, a computer-readable declarative notation that describes a constraint for the field.

3. The method of claim 2 wherein the step of employing, in the description, the computer-readable declarative notation that describes the constraint for the field comprises the step of selecting the constraint to comprise an indication of a relationship between the field and another field of the network packet.

4. The method of claim 1 wherein the step of employing, in the description, the computer-readable declarative notation that describes the one or more fields of the network packet comprises the step of employing, in the description, a computer-readable declarative notation that describes a first field of the network packet and a second field of the network packet.

5. The method of claim 4 wherein the step of employing, in the description, the computer-readable declarative notation that describes the one or more constraints for the at least one field of the one or more fields comprises the step of employing, in the description, a computer-readable declarative notation that describes a constraint for the first field and the second field.

6. The method of claim 4 wherein the step of employing, in the description, the computer-readable declarative notation that describes the one or more constraints for the at least one field of the one or more fields comprises the step of selecting a first constraint to comprise an indication of a relationship between the first field and the second field.

7. The method of claim 6 wherein the step of employing, in the description, the computer-readable declarative notation that describes the one or more constraints for the at least one field of the one or more fields comprises the step of selecting a second constraint to comprise an indication of a second relationship between the first field and the second field.

8. The method of claim 1 wherein the step of employing, in the description, the computer-readable declarative notation that describes the one or more fields of the network packet comprises the step of indicating that a field comprises a repetition of a portion of information in the network packet.

9. The method of claim 1 wherein the step of employing, in the description, the computer-readable declarative notation that describes the one or more fields of the network packet comprises the step of employing, in the description, a computer-readable declarative notation that describes a variable-size field of the network packet, and wherein the step of employing, in the description, the computer-readable declarative notation that describes the one or more constraints for the at least one field of the one or more fields comprises the step of employing, in the description, a computer-readable declarative notation that describes a constraint for the variable-size field.

10. The method of claim 9 wherein the step of employing, in the description, the computer-readable declarative notation that describes the constraint for the variable-size field comprises the step of selecting the constraint to comprise an indication of a size of the variable-size field.

11. The method of claim 1 wherein the network packet corresponds to any protocol of a plurality of protocols, and wherein the step of employing, in the description, the computer-readable declarative notation that describes the one or more fields of the network packet comprises the step of employing, in the description, a computer-readable declarative notation that describes a portion of the network packet.

12. The method of claim 1 wherein the step of employing, in the description, the computer-readable declarative notation that describes the one or more fields of the network packet comprises the step of selecting a computer-readable declarative notation that is based on a high level language, and wherein the step of employing, in the description, the computer-readable declarative notation that describes the one or more constraints for the at least one field of the one or more fields comprises the step of selecting a computer-readable declarative notation that is based on a high level language.

13. The method of claim 1 wherein the step of employing, in the description, the computer-readable declarative notation that describes the one or more constraints for the at least one field of the one or more fields comprises the step of employing, in the description, a computer-readable declarative notation that allows for control of layout of individual bits of the network packet.

14. The method of claim 1 wherein the step of employing, in the description, the computer-readable declarative notation that describes the one or more constraints for the at least one field of the one or more fields comprises the step of selecting a computer-readable declarative notation that describes a format for a field of the network packet.

15. The method of claim 1 in combination with a method for recognizing the portion of the network packet at the network interface, further comprising the steps of:

selecting the representation to comprise syntactic information and semantic information; and employing the representation for recognition of the portion of the network packet at the network interface.

16. The method of claim 1 in combination with a method for preparing for recognition of the portion of the network packet at the network interface, further comprising the step of employing the representation to create one or more instructions for recognition of the portion of the network packet at the network interface.

17. The method of claim 16 wherein the step of employing the representation to create the one or more instructions for recognition of the portion of the network packet at the network interface comprises the step of selecting the one or more instructions to be compatible with a plurality of languages and/or architectures.

18. The method of claim 1 in combination with a method for preparing for recognition of the portion of the network interface, further comprising the step of:

receiving information that related to the portion of the network packet and includes a first part that related to a field of the network packet and a second part that relates to a constraint for the field; and automatically, upon receipt of the information, preparing the representation.

19. The method of claim 18 wherein the step of automatically, upon receipt of the information, preparing the representation comprises the step of preparing the representation to allow for employment of the description for recognition of the portion of the network packet at the network interface.

20. The method of claim 1 wherein the representation comprises a second representation, in combination with a method for preparing a part of an intermediate representation, the intermediate representation serving to represent the portion of the network packet, wherein the second representation is based on the intermediate representation and the intermediate representation is based on the description, further comprising the steps of:

receiving a first representation that is based on a first computer-readable declarative notation that describes a first constraint for a field of the network packet; and preparing, with employment of the first representation and employment of a second computer-readable declarative notation that describes a second constraint for the field of the network packet, the part of the intermediate representation to represent, for the field of the network packet, a combination of the first constraint and the second constraint.

21. The method of claim 1 in combination with a method for preparing the representation, further comprising the steps of:

receiving first information that is based on a first computer-readable declarative notation that describes a first constraint, for a field of the network packet and that includes a reference to a second computer-readable declarative notation that describes a second constraint employable with a field of a packet; and preparing, with employment of the first information and employment of second information that is based on the second computer-readable declarative notation, the representation to allow for application of the second constraint to the field of the network packet.

22. The method of claim 1 in combination with a method for allowing for determination of a type for the network packet at the network interface, further comprising the steps of:

employing, in the description, a first computer-readable declarative notation that describes a first type of packet and a second computer-readable declarative notation that describes a second type of packet; and determining, with reference to information based on the description and with reference to the portion of the network packet after receipt of the portion of the network packet at the network interface, that the network packet is without the first type of packet and comprises the second type of packet.

23. A system in a computer for employing a description of a portion of a network packet, a representation based on the description employable for recognition of the portion of the network packet at a network interface, the system comprising:

a compiler component that employs a computer-readable declarative notation, for the description, that describes one or more fields of the network packet;

wherein the compiler component employs a computer-readable declarative notation, for the description, that describes one or more constraints for at least one field of the one or more fields;

wherein the compiler component automatically converts the description of the portion of the network packet from the computer-readable declarative notation that describes the one or more fields of the network packet into computer-executable code.

24. The system of claim 23 wherein the compiler component employs a computer-readable declarative notation, for the description, that describes a field of the network packet, and wherein the compiler component employs a computer-readable declarative notation, for the description, that describes a constraint for the field.

25. The system of claim 24 wherein the constraint comprises an indication of a relationship between the field and another field of the network packet.

26. The system of claim 23 wherein the compiler component employs a computer-readable declarative notation, for the description, that describes a first field of the network packet and a second field of the network packet.

27. The system of claim 26 wherein the compiler component employs a computer-readable declarative notation, for the description, that describes a constraint for the first field and the second field.

28. The system of claim 26 wherein the one or more constraints for the at least one field of the one or more fields comprises a first constraint, for the first field, that comprises an indication of a relationship between the first field and the second field, and wherein the compiler component employs a computer-readable declarative notation, for the description, that describes the first constraint for the first field and a second constraint for the second field.

29. The system of claim 28 wherein the relationship between the first field and the second field comprises a first relationship between the first field and the second field, and wherein the second constraint comprises an indication of a second relationship between the first field and the second field.

30. The system of claim 26 wherein the compiler component employs an indication that a field comprises a repetition of a portion of information in the network packet.

31. The system of claim 23 wherein the compiler component employs a computer-readable declarative notation, for the description, that describes a variable-size field of the network packet, and wherein the compiler component employs a computer-readable declarative notation, for the description, that describes a constraint for the variable-size field.

32. The system of claim 31 wherein the constraint comprises an indication of a size of the variable-size field.

33. The system of claim 23 wherein the network packet corresponds to any protocol of a plurality of protocols, and wherein the compiler component employs a computer-readable declarative notation, for the description, that describes a portion of the network packet.

34. The system of claim 23 wherein the compiler component employs a computer-readable declarative notation, for the description, that is based on a high level language and that describes the one or more fields of the network packet, and wherein the compiler component employs a computer-readable declarative notation, for the description, that is based on a high level language and describes the one or more constraints for the at least one field of the one or more fields.

35. The system of claim 23 wherein the compiler component employs a computer-readable declarative notation, for the description, that allows for control of layout of individual bits of the network packet.

36. The system of claim 23 wherein the compiler component employs a computer-readable declarative notation, for the description, that describes a format for a field of the network packet.

37. The system of claim 23 in combination with a system for preparing for recognition of the portion of the network packet at the network interface, wherein the compiler component selects the representation to comprise syntactic information and semantic information, wherein the syntactic information and the semantic information are employable for recognition of the portion of the network packet at the network interface.

38. The system of claim 23 in combination with a system for preparing for recognition of the portion of the network packet at the network interface, wherein the compiler component employs the representation to create one or more instructions for recognition of the portion of the network packet at the network interface.

39. The system of claim 37 wherein the compiler component selects the one or more instructions to be compatible with a plurality of languages and/or architectures.

40. The system of claim 23 in combination with a system for preparing for recognition of the portion of the network packet at the network interface, wherein the compiler component receives information that relates to the portion of the network packet and that includes a first part that relates to a field of the network packet and a second part that relates to a constraint for the field, wherein the compiler component automatically, upon receipt of the information, prepares the representation.

41. The system of claim 40 wherein the compiler component automatically, upon receipt of the information, prepares the representation to allow for employment of the description for recognition of the portion of the network packet at the network interface.

42. The system of claim 23 wherein the representation comprises a second representation, in combination with a system for preparing a part of an intermediate representation, the intermediate representation serving to represent the portion of the network packet, wherein the second representation is based on the intermediate representation and the intermediate representation is based on the description;

wherein the compiler component receives a first representation that is based on a first computer-readable declarative notation that describes a first constraint for a field of the network packet;

wherein the compiler component prepares, with employment of the first representation and employment of a second computer-readable declarative notation that describes a second constraint for the field of the network packet, the part of the intermediate representation to represent, for the field of the network packet, a combination of the first constraint and the second constraint.

43. The system of claim 23 in combination with a system for preparing the representation, wherein the compiler component receives first information that is based on a fist computer-readable declarative notation that describes a first constraint, for a field of the network packet and that includes a reference to a second computer-readable declarative notation that describes a second constraint employable with a field of a packet;

wherein the compiler component prepares, with employment of the first information and employment of second information that is based on the second computer-readable declarative notation, the representation to allow for application of the second constraint to the field of the network packet.

44. The system of claim 23 in combination with a system for allowing for determination of a type for the network packet at the network interface, wherein the compiler component employs a first computer-readable declarative notation, for the description, that describes a first type of packet and a second computer-readable declarative notation, for the description, that describes a second type of packet;

wherein the compiler component prepares information, based on the description, that is employable with reference to the portion of the network packet, upon receipt of the portion of the network packet at the network interface, for determination that the network packet is without the first type of packet and comprises the second type of packet.

45. A computer program product executable by a computer, said computer program product comprising:

at least one computer usable medium of the computer program product having computer readable program code means within the computer for causing employment of a description of a portion of a network packet, a representation based on the description employable for recognition of the portion of the network packet at a network interface, the computer readable program code means comprising:

computer readable program code means within the computer for causing the computer to employ a computer-readable declarative notation, for the description, that describes one or more fields of the network packet;

computer readable program code means within the computer for causing the computer to employ a computer-readable declarative notation, for the description, that describes one or more constraints for at least one field of the one or more fields; and computer readable program code means within the computer for automatically converting the description of the portion of the network packet from the computer-readable declarative notation that describes the one or more fields of the network packet into computer-executable code.

46. The computer program product of claim 45 wherein the at least one computer usable medium includes second computer readable program code means within the computer for causing preparation for recognition of the portion of the network packet at the network interface, the second computer readable program code means comprising:

computer readable program code means within the computer for causing a computer to receive information that relates to the portion of the network packet and includes a first part that relates to a field of the network packet and a second part that relates to a constraint for the field; and computer readable program code means within the computer for causing a computer to automatically, upon receipt of the information, prepare the representation.

47. The computer program product of claim 46 wherein the computer readable program code means for causing a computer to automatically, upon receipt of the information, prepare the representation comprises computer readable program code means within the computer for causing a computer to prepare the representation to allow for employment of the description for recognition of the portion of the network packet at the network interface.

48. The computer program product of claim 45 wherein the representation comprises a second representation, wherein the at least one computer usable medium includes second computer readable program code means within the computer for causing preparation of a part of an intermediate representation, the intermediate representation serving to represent the portion of the network packet, wherein the second representation is based on the intermediate representation and the intermediate representation is based on the description, the second computer readable program code means comprising:

computer readable program code means within the computer for causing a computer to receive a first representation that is based on a first computer-readable declarative notation that describes a first constraint for a field of the network packet; and computer readable program code means within the computer for causing a computer to prepare, with employment of the representation and employment of a second computer-readable declarative notation that describes a second constraint for the field of the network packet, the part of the intermediate representation to represent, for the field of the network packet, a combination of the first constraint and the second constraint.

49. A computer program product of claim 45 wherein the at least one computer usable medium includes second computer readable program code means within the computer for causing preparation of the representation, the second computer readable program code means comprising:

computer readable program code means within the computer for causing a computer to receive first information that is based on a first computer-readable declarative notation that describes a first constraint, for a field of the network packet and that includes a reference to a second computer-readable declarative notation that describes a second constraint employable with a field of a packet; and computer readable program code means within the computer for causing a computer to prepare, with employment of the first information and employment of second information that is based on the second computer-readable declarative notation, the representation to allow for application of the second constraint to the field of the network packet.

50. The computer program product of claim 45 wherein the at least one computer usable medium includes second computer readable program code means within the computer for causing allowance for determination of a type for the network packet at the network interface, the second computer readable program code means comprising:

computer readable program code means within the computer for causing a computer to employ a first computer-readable declarative notation, for the description, that describes a first type of packet and a second computer-readable declarative notation, for the description, that describes a second type of packet; and computer readable program means within the computer for causing a computer to prepare information, based on the description, that is employable with reference to the portion of the network packet, upon receipt of the portion of the network packet at the network interface, for determination that the network packet is without the fist type of packet and comprises the second type of packet.

51. The method of claim 1 wherein the step of automatically converting the description of the portion of the network packet from the computer-readable declarative notation that describes the one or more fields of the network packet into the computer-executable code comprises the steps of:

generating an interface code with a compiler component; and employing the interface code to convert the description of the portion of the network packet from the computer-readable declarative notation that describes the one or more fields of the network packet into the computer-executable code.

52. The method of claim 1 further comprising the step of:

automatically converting the description of the portion of the network packet from the computer-readable declarative notation that describes the one or more constraints for the at least one field of the one or more fields into computer-executable code.

53. The method of claim 52 wherein the one or more fields of the network packet comprise a length field, wherein the step of automatically converting the description of the portion of the network packet from the computer-readable declarative notation that describes the one or more constraints for the at least one field of the one or more fields into the computer-executable code comprises the steps of:

automatically converting the description of the portion of the network packet from the computer-readable declarative notation that describes the one or more constraints of the length field into procedural code.

54. The system of claim 23 wherein the compiler component generates an interface code, wherein the compiler component employs the interface code to convert the description of the portion of the network packet from the computer-readable declarative notation that describes the one or more fields of the network packet into the computer-executable code.

55. The system of claim 23 wherein the compiler component automatically converts the description of the portion of the network packet from the computer-readable declarative notation that describes the one or more constraints for the at least one field of the one or more fields into computer-executable code.

56. The system of claim 55 wherein the one or more fields of the network packet comprise a length field, wherein the compiler component automatically converts the description of the portion of the network packet from the computer-readable declarative notation that describes the one or more constraints of the length field into procedural code.

57. The computer program product of claim 45 wherein the computer readable program code means within the computer for automatically converting the description of the portion of the network packet generates an interface code, wherein the computer readable program code means within the computer for automatically converting the description of the portion of the network packet employs the interface code to convert the description of the portion of the network packet from the computer-readable declarative notation that describes the one or more fields of the network packet into the computer-executable code.

58. The computer program product of claim 45 further comprising:

computer readable program code means within the computer for automatically converting the description of the portion of the network packet from the computer-readable declarative notation that describes the one or more constraints for the at least one field of the one or more fields into computer-executable code.

59. The computer program product of claim 58 wherein the one or more fields of the network packet comprise a length field, wherein the computer readable program code means within the computer for automatically converting the description of the portion of the network packet from the computer-readable declarative notation that describes the one or more constraints for the at least one field of the one or more fields into the computer-executable code, automatically converts the description of the portion of the network packet from the computer-readable declarative notation that describes the one or more constraints of the length field into procedural code.

* * * * *